Dec. 30, 1958     O. ÖHRNELL     2,866,533
CONVEYING DEVICE
Filed March 15, 1954     2 Sheets—Sheet 1
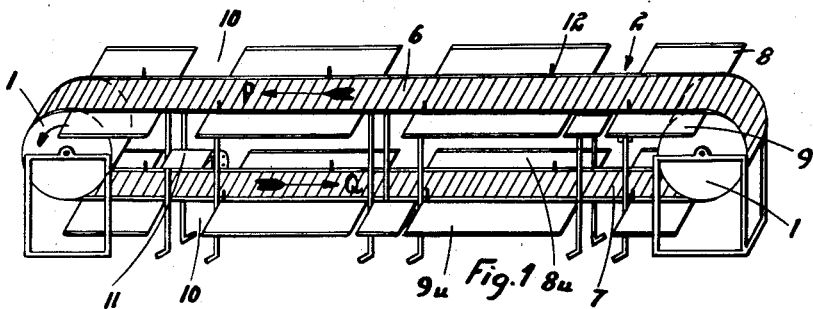
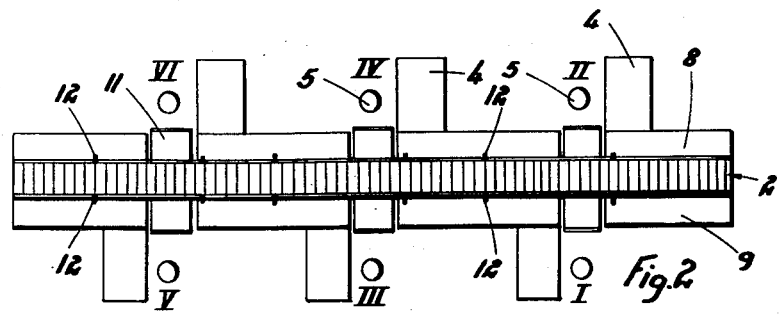
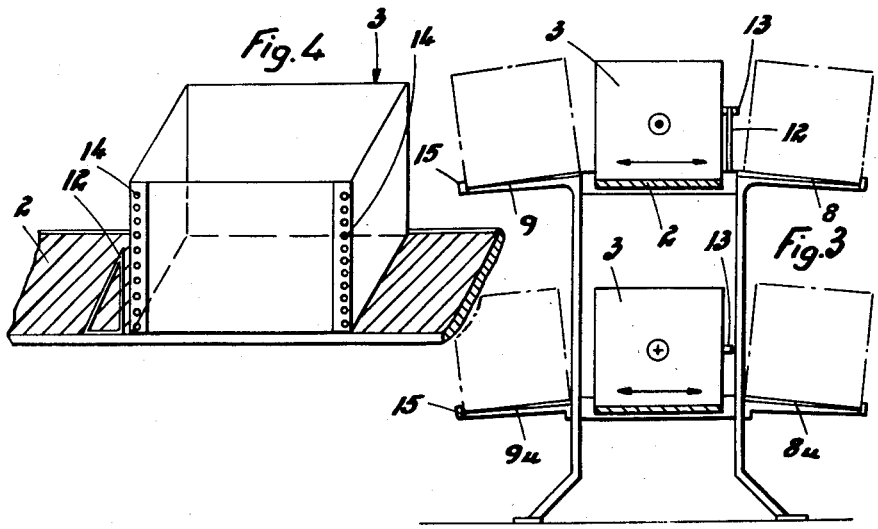
OLOF ÖHRNELL
INVENTOR
BY Wenderoth, Lind & Ponack
ATTORNEYS Dec. 30, 1958   O. ÖHRNELL   2,866,533
CONVEYING DEVICE
Filed March 15, 1954   2 Sheets-Sheet 2
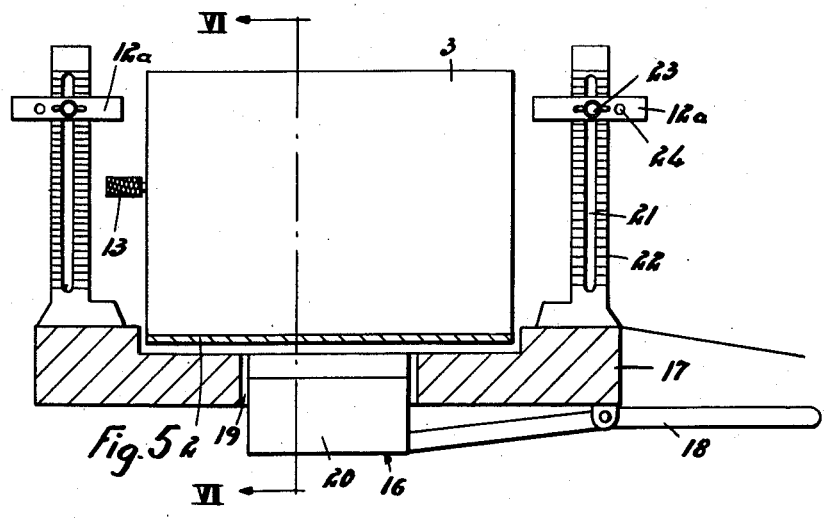
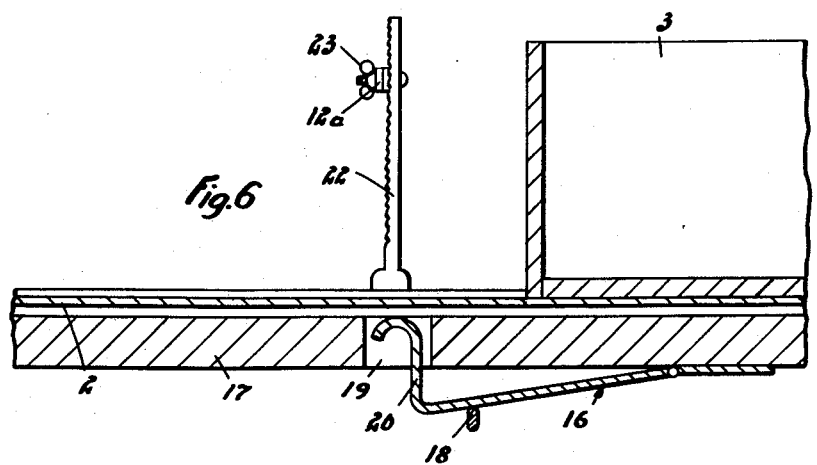
OLAF ÖHRNELL
INVENTOR
BY Wenderoth, Lind & Ponack
ATTORNEYS

United States Patent Office 2,866,533
Patented Dec. 30, 1958

2,866,533

CONVEYING DEVICE

Olof Öhrnell, Norrkoping, Sweden

Application March 15, 1954, Serial No. 416,323

Claims priority, application Sweden March 14, 1953

1 Claim. (Cl. 198—19)

This invention relates to a conveying device which is intended for use in continuous manufacture and comprises a conveyor track for a number of boxes containing the necessary parts for the manufacture and adapted to be retained at the various working stations along the track by stop means located at said working stations. The invention is substantially characterized in that the stop means are constituted by means fixedly arranged at different heights above the conveyor track at the various working stations, said means being adapted to cooperate with abutments which are adjustable into different height positions on said boxes.

Further objects and advantages of the invention will become apparent from the following description, reference being had to the accompanying drawings illustrating two preferred embodiments of the conveying device according to the invention. In the drawings:

Fig. 1 is a perspective view of one embodiment of the conveying device for servicing six working stations, of which three are arranged on either side of the conveyor track.

Fig. 2 is a plan view of the same conveying device.

Fig. 3 is a vertical section on a larger scale of the conveying device, boxes being placed on the two conveyor tracks included in the conveying device.

Fig. 4 is a perspective view of a box placed on a conveyor track, of which a section only is shown.

Fig. 5 is a vertical transverse section of another embodiment of the conveying device.

Fig. 6 is a longitudinal section of this conveying device on line VI—VI in Fig. 5.

With reference to the drawings, a continuously driven, endless conveyor belt 2 is passed over two cylinders 1. Said conveyor belt 2, which preferably is a steel belt, conveys the parts necessary for the manufacture in boxes 3 to the various working stations I—VI located along the belt, a working machine 4 with pertaining seat 5 being arranged at each working station.

The lower run 7 of the conveyor belt 2 is intended for use as a return track for boxes 3 to be sent in the direction opposite to the conveying direction of the upper belt run 6. Along each side of the two runs 6 and 7 of the belt 2 and at a level therewith there is arranged a table 8, 8a, 9 and 9a for receiving boxes 3 which have been stopped at the working stations. At each station the tables are interrupted and each interruption 10 is of a length, as seen in the longitudinal direction of the track, that is somewhat larger than that of a box 3. The interruptions 10 in the two tables at the same side are situated in vertical pairs opposite one another and in said interruptions an elevator plane 11 is vertically movable for transmitting boxes 3 from the upper table to the lower one and vice versa.

The stop means for the boxes 3 are constituted by means which are fixedly arranged at the working stations I—VI at heights over the track which increases stepwise in the direction of motion of the respective conveyor 6, 7. The directions of motion is indicated by arrows P and Q in Fig. 1. In the embodiment shown in Figs. 1–4 the stop means are formed by the top ends of uprights 12 disposed laterally of the conveyor belt 2. Said stops 12 are adapted to cooperate with abutments adjustable at different heights on the boxes 3 and consisting in the embodiment shown of abutments 13 each of which is formed with a plug for its mounting in a hole 14 in the side of the box 3. For this purpose, all of the boxes 3 are provided at each side with a vertical series of such holes 14, each of said holes being situated at the same height above the bottom face of the box 3 as a corresponding stop 12 above the respective track 6 and 7. In the illustrated embodiment of the box 3 two series of holes are provided on each side of the box at the corners thereof, whereby it was not necessary to turn the box 3 to bring it into correct position on the conveyor belt 2. The stops 12 and the holes 14 in the box 3 are preferably provided with corresponding figures indicating the order of the working station along the conveyor belt 2.

In the embodiment shown in Figs. 1 to 4 the conveyor track 2 is provided both at the upper run 6 and at the lower run 7 with two stops 12 at each working station I—VI, which are disposed at the same height and on either side of the track. Consequently, a box 3 can be stopped at the desired working station irrespectively of whether the abutment 13 is located at one or the other side of the box 3. Such an arrangement enables the personnel on one side of the belt 2 to send boxes 3 to the working stations on the other side thereof, since the abutments 13 can always be mounted on that side of the box which faces the working station from which the box 3 is sent.

The elevator device 11 comprises a plate guided in vertical guides which are provided with suitable stops enabling stopping of the elevator in an intermediate position between the upper and the lower table so that a box 3 may be held at a convenient height during work for removal of e. g. work pieces. The elevator 11 is preferably manually driven and provided with a counterweight device for equalizing the load on the elevator plate.

Especially in small installations and installations of average size the work boxes 3 can very well be removed from the belt by hand, which is done, after a box has been stopped, by a single turn of the hand and can be effected at the first suitable opportunity. If it is deemed desirable, there may be provided at each working station however a transverse feed device (not shown) which automatically transmits a stopped box 3 from the belt to the table. Such a device may preferably consist of a toothed segment or the like which, when the box 3 is stopped, engages with a transverse row of teeth at the underside of the box and moves the box laterally outwards.

To facilitate manual removal of the boxes 3 from the belt 2 the tables are somewhat inclined downwardly and outwardly and provided with a stop rib 15 preventing the boxes from sliding off the tables, as is apparent from Fig. 3.

According to the embodiment of the conveying device shown in Figs. 5 and 6 the stop 12a has been given a height dimension which is at most equal to the distance between two adjacent holes for the abutment 13 which in turn has at most the same height dimension as the stop. Thanks to this arrangement it is possible to convey the boxes 3 past working stations where the stops 12a are disposed at a higher or lower level than is the abutment 13 arranged on the box 3.

Such a stop 12 of limited height dimension is of special importance when the working stations both at the upper and at the lower run of the endless belt 2 are provided with stops 12a, for in whatever manner the stops are disposed all stops 12a at one and the same working station may be arranged at the same height above the respective run of the belt 2. If a box 3 cannot be received at the working station when it is stopped on the upper run, it is permitted to continue to the end of said run where the conveyor belt 2 is provided with means, e. g. a roller track, transmitting the box 3 to the lower run which returns it to the working station where it is retained by the stops 12a disposed here at the same height.

To permit the continued transport of the box 3 along the upper run the conveyor belt 2 is provided at the different working stations with a lifting mechanism for the boxes 3 by means of which said boxes are lifted so high that their abutments 13 freely pass the stops 12a arranged at the respective working station. In the embodiment shown the lifting mechanism comprises a metal sheet 16 which is bent in a suitable manner and pivotally mounted on a fixed base 17 for the conveyor belt 2, said sheet 16 being operable by an arm 18. On depression of the operating arm 18 a portion 20 of the metal sheet 16, which portion extends upwardly through a slot 19 in the base 17, is moved into bearing engagement with the conveyor belt 2 so that said belt and consequently the box 3 situated on this section of the belt will be lifted. Of course, other types of lifting mechanisms could be utilized, and the choice of lifting mechanism will be dependent on the nature of the conveyor belt 2.

To permit vertical adjustment the stops 12a are disposed in uprights 22 provided with slots 21. To permit securing of the stops 12a by means of a bolt connection 23 or the like to the uprights 22, the stops 12 as well as the uprights 22 are provided with grooves or the like which are adopted to engage with each other. Instead of being slotted (21) the uprights 22 may be provided with holes which have then to be in register with the holes for the abutments 13 in the boxes 3.

In some cases it may be suitable to change the horizontal distance of the stops 12a from the conveyor belt 2, and the stops 12a are therefore made laterally adjustable. For this purpose they may be provided either with more holes 24, as is shown in the drawing, or with a slot. By this arrangement several working stations may be provided with stops 12 at one and the same height, provided that stops 13 are used which extend differently far in lateral direction.

The manner of operation of the conveying device will be described in detail in the following. It is assumed that it is to be used for the continuous manufacture of industrial products, for instance clothes, that comprise a plurality of details which are treated and/or assembled stepwise at the working stations I—VI along the continuously driven conveyor belt 2. All work pieces for a suitable number of units, e. g. clothes, are placed, sorted in types and easily available, in at least one box 3 for each working station. The abutments 13 are inserted in the holes 14 of the boxes 3 that correspond to the working stations to which the boxes 3 are to be sent. After that the boxes 3 are sent out to the respective working station where they are left sliding on the conveyor belt 2 until the operator at the working station in question has the opportunity of transferring them to his table. The box 3 is kept on that table during the working operation concerned, whereupon the abutment 13 is moved to a new hole 14 and the box with the treated and non-treated work pieces is permitted to continue its travel on the upper or lower run of the belt 2 to a subsequent or preceding working station for the next working operation etc. until the box 3 finally contains the finished units, e. g. the clothes. New boxes 3 which may arrive at a working station during a working operation are either permitted to pass, the lifting device being then used, or removed from the belt 2 and placed on the upper or lower table at one or the other side of the elevator device 11, while the box 3 which is used for the moment is kept on the elevator plate which can preferably be situated midway between the upper and lower run of the belt.

While the invention has been described with reference to the embodiments shown in the drawings, it must not be considered as limited to these particular embodiments, for it can be modified in several ways within the scope of the appendant claim. Thus e. g. the conveyor track may consist of a roller track, a chain conveyor or the like instead of an endless belt. The conveyor track or tracks may also be built so as to make an angle with each other, while the continuous transport of the working boxes is maintained. The length of the conveyor track can of course also be altered.

What I claim and desire to secured by Letters Patent is:

In a conveying device for use in continuous manufacture of industrial products having a plurality of operations performed thereon at a plurality of stations situated along a continuously driven endless conveyor track having an upper and a lower run, workpieces being conveyed in boxes on said conveyor track and distributed to the various stations, stop means being provided to retain a box on the conveyor track at the stations, and in which conveying device the lower run of the conveyor track is adapted to serve as a return track for the boxes, the combination of a table along each side of each run of the track and at a level therewith for receiving boxes that have been retained at a working station, the tables at each working station having an interruption therein, the length of which is somewhat larger than that of a box, and a platform vertically movably arranged in said interruption to receive and transfer a box between the upper and the lower table.

References Cited in the file of this patent

UNITED STATES PATENTS

| | | |
|---|---|---|
| 2,264,461 | Steves | Dec. 2, 1941 |
| 2,516,985 | Hecht | Aug. 1, 1950 |
| 2,600,038 | Whaley | June 10, 1952 |
| 2,640,581 | Abitz | June 2, 1953 |